(12) United States Patent
Choi et al.

(10) Patent No.: US 11,501,500 B2
(45) Date of Patent: Nov. 15, 2022

(54) AUGMENTED REALITY (AR) PROVIDING APPARATUS AND METHOD FOR RECOGNIZING CONTEXT USING NEURAL NETWORK, AND NON-TRANSITORY COMPUTER-READABLE RECORD MEDIUM FOR EXECUTING THE METHOD

(71) Applicant: LINE Plus Corporation, Seongnam-si (KR)

(72) Inventors: Sang Jo Choi, Seoul (KR); Hee Cheol Park, Seoul (KR); Hyoung Jun Noh, Seoul (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 68 days.

(21) Appl. No.: 17/016,845

(22) Filed: Sep. 10, 2020

(65) Prior Publication Data

US 2020/0410770 A1 Dec. 31, 2020

Related U.S. Application Data

(63) Continuation of application No. PCT/KR2018/002868, filed on Mar. 12, 2018.

(51) Int. Cl.
*G06T 19/00* (2011.01)
*G06T 7/13* (2017.01)
(Continued)

(52) U.S. Cl.
CPC ............ *G06T 19/006* (2013.01); *G06K 9/623* (2013.01); *G06N 3/08* (2013.01); *G06T 7/13* (2017.01);
(Continued)

(58) Field of Classification Search
None
See application file for complete search history.

(56) References Cited

U.S. PATENT DOCUMENTS

2012/0041979 A1* 2/2012 Lee .................. G06N 5/022
707/E17.014
2014/0079297 A1* 3/2014 Tadayon .............. G06V 40/172
382/118
(Continued)

FOREIGN PATENT DOCUMENTS

JP 2012/504830 A 2/2012
JP 2015/526168 A 9/2015
(Continued)

OTHER PUBLICATIONS

International Search Report for International Application No. PCT/KR2018/002868 dated Dec. 13, 2018.

*Primary Examiner* — Tapas Mazumder
(74) *Attorney, Agent, or Firm* — Harness, Dickey & Pierce, P.L.C.

(57) ABSTRACT

An augmented reality (AR) providing method for recognizing a context using a neural network includes acquiring, by processing circuitry, a video; analyzing, by the processing circuitry, the video and rendering the video to arrange a virtual object on a plane included in the video; determining whether a scene change is present in a current frame by comparing the current frame included in the video with a previous frame; determining a context recognition processing status for the video based on the determining of whether the scene change is present in the current frame; and in response to determining that the context recognition processing status is true, analyzing at least one of the video or a sensing value received from a sensor using the neural network and calculating at least one piece of context information, and generating additional content to which the
(Continued)

context information is applied and providing the additional content.

20 Claims, 10 Drawing Sheets

(51) Int. Cl.
*G06T 7/246* (2017.01)
*G06K 9/62* (2022.01)
*G06N 3/08* (2006.01)
*G06V 10/75* (2022.01)

(52) U.S. Cl.
CPC ............ *G06T 7/248* (2017.01); *G06V 10/757* (2022.01); *G06T 2207/10016* (2013.01)

(56) References Cited

U.S. PATENT DOCUMENTS

| | | |
|---|---|---|
| 2016/0048723 A1 | 2/2016 | Jeong et al. |
| 2017/0270582 A1 | 9/2017 | Forss |
| 2018/0300709 A1* | 10/2018 | Singhai .............. G06Q 20/3224 |
| 2019/0208007 A1* | 7/2019 | Khalid ................ H04L 67/1021 |
| 2020/0187869 A1* | 6/2020 | Thiemjarus ............ G16H 50/30 |

FOREIGN PATENT DOCUMENTS

| | | |
|---|---|---|
| JP | 2017/156886 A | 9/2017 |
| KR | 10-2013-0060339 A | 6/2013 |
| KR | 10-2014-0082610 A | 7/2014 |
| KR | 10-2017-0022088 A | 3/2017 |
| KR | 10-2017-0122443 A | 11/2017 |

* cited by examiner

AUGMENTED REALITY (AR) PROVIDING APPARATUS AND METHOD FOR RECOGNIZING CONTEXT USING NEURAL NETWORK, AND NON-TRANSITORY COMPUTER-READABLE RECORD MEDIUM FOR EXECUTING THE METHOD

CROSS-REFERENCE TO RELATED APPLICATIONS

This U.S. non-provisional application is a continuation application of, and claims the benefit of priority under 35 U.S.C. § 365(c) from International Application PCT/KR2018/002868, which has an International filing date of Mar. 12, 2018, the disclosure of which is incorporated herein by reference in its entirety.

BACKGROUND

1. Technical Field

One or more example embodiments relate to an augmented reality (AR) providing apparatus and providing method for recognizing context using a neural network, and a non-transitory computer-readable record medium storing instructions that, when executed by a processor, cause the processor to perform the method.

2. Related Art

Augmented reality (AR) pertains to a field of virtual reality (VR) and refers to computer graphics technology for synthesizing a virtual object or information in a real environment to make the virtual object or the information appear as being present in the real environment. The AR is also referred to as mixed reality (MR) since a single video is displayed by synthesizing a virtual world having additional information with the real world in real time.

To implement AR, a process of adding a virtual object to each frame of a captured video needs to be performed every frame of the video and thus, a relatively great processing capability of a processor is required depending on a resolution and a frame rate of the captured video, and the like. In the case of a mobile computing device that includes a limited processing capability of a processor, it may be difficult to simultaneously perform a process of rendering a virtual object and a process of calculating context information using a neural network.

SUMMARY

Example embodiments may analyze a video in real time using a neural network and may provide a video to which an analysis result is applied, while providing augmented reality (AR) in a video captured through a video sensor in a computing device with a limited performance.

According to at least some example embodiments, an augmented reality (AR) providing method for recognizing a context using a neural network includes acquiring, by processing circuitry, a video; analyzing, by the processing circuitry, the video and rendering the video to arrange a virtual object on a plane included in the video; determining whether a scene change is present in a current frame by comparing the current frame included in the video with a previous frame; determining a context recognition processing status for the video based on the determining of whether the scene change is present in the current frame; and in response to determining that the context recognition processing status is true, analyzing at least one of the video or a sensing value received from a sensor using the neural network and calculating at least one piece of context information, and generating additional content to which the context information is applied and providing the additional content.

The method may further include determining whether a processing capability of the processing circuitry exceeds a threshold value, wherein the determining of the context recognition processing status for the video is further based on the determining of whether the processing capability of the processing circuitry exceeds the threshold value.

The method may further include determining whether an output frame rate of the video is less than an average frame rate, wherein, the determining of the context recognition processing status for the video is further based on the determining of whether the output frame rate of the video is less than the average frame rate.

The determining whether the scene change is present may include determining whether the scene change is present by calculating a distribution diagram in which pixels of the current frame are distributed based on color values, and comparing the distribution diagram to a distribution diagram of the previous frame.

The determining whether the scene change is present may include extracting a color and a shape of an object by synthesizing edge information using edge information detected from the current frame and determining whether the scene change is present based on the color and the shape of the object.

The calculating of the context information may include acquiring the context information by limiting, according to a user input, a type of context information calculated in response to the user input.

The video is picture data may be captured using a camera or generated using another application and then output.

The providing of the additional content may include providing content including the context information, or generating speech utterance content in a dialog form using the context information and providing the speech utterance content through the virtual object.

The calculating of the at least one piece of context information may include calculating the context information in a form of a probability map that further includes a matching probability about each piece of context information, and ranking and forwarding the at least one piece of context information based on the matching probability about each piece of context information.

According to at least some example embodiments, an augmented reality (AR) providing apparatus includes processing circuitry configured to acquire a video; analyze the video and rendering the video to arrange a virtual object on a plane included in the video; determine whether a scene change is present in a current frame by comparing the current frame included in the video with a previous frame; determine a context recognition processing status for the video based on the determining of whether the scene change is present in the current frame; and in response to determining that the context recognition processing status is true, analyze at least one of the video or a sensing value received from a sensor using a neural network and calculating at least one piece of context information, and generate additional content to which the context information is applied and providing the additional content.

The processing circuitry may be further configured to determine whether a processing capability of the processing circuitry exceeds a threshold value, and the processing circuitry may be further configured such that the determining of the context recognition processing status for the video is further based on the determining of whether the processing capability of the processing circuitry exceeds the threshold value.

The processing circuitry may be further configured to determine whether an output frame rate of the video is less than an average frame rate, and the processing circuitry may be further configured such that the determining of the context recognition processing status for the video is further based on the determining of whether the output frame rate of the video is less than the average frame rate.

The processing circuitry may be further configured such that the determining of whether the scene change is present includes determining whether the scene change is present by calculating a distribution diagram in which pixels of the current frame are distributed based on color values, and comparing the distribution diagram to a distribution diagram of the previous frame.

The processing circuitry may be further configured such that the determining of whether the scene change is present includes extracting a color and a shape of an object by synthesizing edge information using edge information detected from the current frame and determining whether the scene change is present based on the color and the shape of the object.

The processing circuitry may be further configured to acquire the context information by limiting, according to a user input, a type of context information calculated in response to the user input.

The processing circuitry may be further configured such that the video is picture data captured using a camera or generated using another application and then output.

The processing circuitry may be further configured to provide content including the context information, or generate speech utterance content in a dialog form using the context information and to provide the speech utterance content through the virtual object.

The processing circuitry may further configured to calculate the context information in a form of a probability map that further includes a matching probability about each piece of context information, and rank and forward the at least one piece of context information based on the matching probability about each piece of context information.

According to at least some example embodiments, a non-transitory computer-readable medium stores instructions that, when executed by a processor, cause the processor to perform the AR providing method.

Other aspects, features advantages in addition to the aforementioned aspects, features, and advantages will become clear from the following drawings, claims, and detailed description.

A method of simultaneously performing AR and deep learning-based video processing in a terminal with limited performance according to some example embodiments and a non-transitory computer-readable record medium storing instructions that, when executed by a processor, cause the processor to perform the method may prevent a screen output latency caused by a lack of computing resources of a computing device and may reduce the power consumption of the computing device by adjusting an execution interval or frequency of video processing based on a neural network.

Also, a method of simultaneously performing AR and deep learning based video processing in a terminal with a limited performance according to some example embodiments and a non-transitory computer-readable record medium storing instructions that, when executed by a processor, cause the processor to perform the method may prevent a screen output latency caused by a lack of computing resources of a computing device by preferentially allocating a computing resource to a thread that provides AR.

Further areas of applicability will become apparent from the description provided herein. The description and specific examples in this summary are intended for purposes of illustration only and are not intended to limit the scope of the present disclosure.

DETAILED DESCRIPTION

Figure 1:
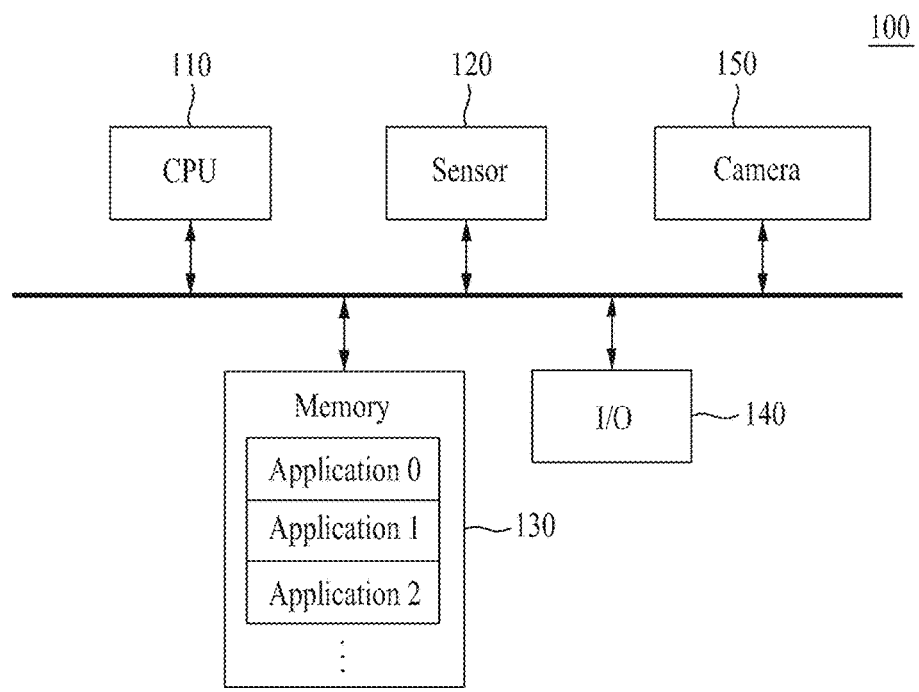
FIG. 1 is a diagram illustrating a structure of a system according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Various modifications may be made to the example embodiments and specific example embodiments will be described in the detailed description with reference to the accompanying drawings. The effect and features of the disclosure and methods for achieving the same may become clear by referring to the following example embodiments, described with reference to the drawings. However, the present disclosure is not limited to the following example embodiments and may be implemented in various forms.

Here, the term "neural network" may refer to an algorithm set configured to identify and/or determine objects in a video by extracting and using various attributes in the video based on a result of statistical machine learning. The neural network may identify objects in a video by abstracting various abstracts included in the video input to the neural network. In this case, abstracting the attributes in the video may represent detecting attributes from the video and determining a key attribute from among the detected attributes. The neural network may be implemented by one or more machine learning algorithms in accordance with one or more types of neural network models, examples of which include, but are not limited to, an artificial neural network (ANN), a convolutional neural network (CNN), a deep convolutional neural network (DCNN), and a recurrent neural network (RNN). The neural network may be embodied by processing circuitry including hardware (e.g., an application-specific integrated circuit (ASIC) or field programmable gate array (FPGA)) physically structured to carry out any or all operations described in the present specification as being performed by a neural network (or an element thereof) or a combination of hardware and software (e.g., memory storing computer-executable instructions corresponding to any or all operations described in the present specification as being performed by the AR application 200 (or a module or element thereof) and one or more processors configured to execute the computer-executable instructions). The central processing unit (CPU) 110, which will be discussed in greater detail below with reference to FIG. 1, is an example of the above-referenced processing circuitry.

Augmented reality (AR) providing apparatuses disclosed herein may be implemented using hardware or combination of software and hardware. For example, the AR providing apparatuses may be implemented on a specifically designed machine or a network interface card as an operating system (OS) kernel, as a separate user process, or as a library package limited within network applications. In specific example embodiments, techniques disclosed herein may be implemented as software, such as an OS, or as an application that operates on the OS.

Software/hardware hybrid implementation example(s) of at least a portion of example embodiment(s) among AR providing example embodiment(s) disclosed herein may be implemented on a programmable machine selectively activated or reconstructed by a computer program stored in a memory. Such network devices may have a plurality of network interfaces that may be configured or designed to use different types of network communication protocols. A general architecture for a portion of the machines may be represented from the description disclosed herein. According to detailed example embodiments, at least a portion of features and/or functions of various AR providing example embodiments disclosed herein may be implemented on a final user computer system, a computer, a network server or a server system, a mobile computing device (e.g., a personal digital assistant (PDA), a mobile phone, a smartphone, a laptop computer, a tablet computer, and the like), a consumer electronic device, a music player, or any other suitable electronic device, a router, a switch, etc., or at least one general network host machine, such as any combination thereof. In at least a portion of some example embodiments, at least a portion of features and/or functions of various AR providing example embodiments disclosed herein may be implemented in at least one virtualized computing environments (e.g., network computing clouds, and the like).

FIG. 1 is a diagram illustrating a computing device 100 suitable to implement at least a portion of AR providing features and/or functions disclosed herein. Here, the computing device 100 may be, for example, a final user computer system, a network server or a server system, a mobile computing device (e.g., a smartphone, a laptop computer, a tablet computer, and the like), a consumer electronic device, a music player, or any other suitable electronic device, or any combination or a portion thereof. The computing device 100 may communicate with other computing devices, such as, for example, clients and/or servers through a communication network, such as the internet, using known protocols for such communication, in wired and/or wireless manner.

According to at least one example embodiment, referring to FIG. 1, the computing device 100 includes a central processing unit (CPU) 110, a memory 130, an input/output (I/O) device 140, and a camera 150. If operating under control of appropriate software or firmware, the CPU 110 may have responsibility of implementing specific functions associated with functions of a specially configured computing device or machine. For example, in at least one example embodiment, a user terminal corresponding to the computing device 100 may be configured or designed to function as an electronic device using the CPU 110, the memory 130, the I/O device 140, and the camera 150. The I/O device may include circuitry for performing data/signal input and/or output operations. Accordingly, the I/O device may also be referred to as I/O circuitry 140. In at least one example embodiment, the CPU 110 may perform at least one of, for example, rendering a virtual object in AR, context recognition based on a neural network, and functions and/or operations under control of software modules/components capable of including an OS and any appropriate application software, drivers, and the like.

The CPU 110 may include at least one processor, such as a processor from microprocessors of Qualcomm or Intel or microprocessors of MIPS. Thus, in the present specification, the CPU 110 may also be referred to as the processor 110. Also, the CPU 110 may include a graphics processing unit (GPU) for graphics processing. In some example embodiments, the processor(s) 110 may include hardware (e.g., an application-specific integrated circuit (ASIC), an electrically erasable programmable read-only memory (EEPROM), a field-programmable gate array (FPGA), etc.) specially designed to control operations of the computing device 100. In at least some example embodiments, the memory 130 (e.g., a non-volatile RAM and/or ROM) may be a portion of the CPU 110. In addition, the memory 130 may be coupled to a system in many different manners. The memory 130 may be used for various purposes, for example, caching and/or storing data, programming instructions, and the like. Although FIG. 1 illustrates a single CPU 110, it is provided as an example only and one or more CPUs 110 may be provided.

The term "processor" used herein broadly refers to a microcontroller, a microcomputer, a programmable logic control device, ASIC, and any other programmable circuits, without being limited to integrated circuits referred to as a processor in the art.

According to at least one example embodiment, interfaces are provided as interface cards. In general, the interfaces may control transmission and reception of data packets through a computing network and may also support other peripheral devices used with the computing device 100. Ethernet interfaces, frame relay interfaces, cable interfaces, digital subscriber line (DSL) interfaces, token ring interfaces, and the like may be provided. Additionally, various types of interfaces may be provided, such as for example, a universal serial bus (USB), Serial, Ethernet, firewire, PCI, parallel, radio frequency (RF), Bluetooth™, near field communication (e.g., using a near field magnetic field), 802.11 (WiFi), a frame relay, TCP/IP, an integrated service digital network (ISDN), a high speed Ethernet interface, gigabit Ethernet interface, an asynchronous transfer mode (ATM) interface, a high-speed serial interface (HSSI) interface, a Point of Sale (POS) interface, a fiber data distributed interface (FDDI), and the like. In general, such interfaces may include ports suitable for communication with appropriate media. In some cases, the interfaces may also include an independent processor. Also, in some cases, the interfaces may include a volatile and/or non-volatile memory (e.g., RAM).

Although the system of FIG. 1 illustrates a single specific architecture for the computing device 100 to implement techniques of example embodiments described herein, the architecture illustrated in FIG. 1 is provided as an example and is not the only a device architecture capable of implementing at least one or more of the features and techniques described herein. For example, architectures having a single or a plurality of processors 110 may be used. The processors 110 may be present in a single device or may be distributed over a plurality of devices. According to at least one example embodiment, the processor 110 may perform routing operations and communication. In various example embodiments, different types of context information generation features and/or functions may be implemented by a context information generation system that includes a client device (e.g., a personal smartphone that executes client software) and server system(s) (e.g., a server system, which is described below).

Regardless of a configuration of a network device, the system according to the example embodiments may employ at least one memory or memory module (e.g., the memory 130) configured to store data, program instructions for general-purpose network operations, and/or other information related to functions of context information generation techniques described herein. The program instructions may control, for example, an operation of an OS and/one or more applications. One or more memories may be configured to store data structure, advertising information, user click and impression information, and/or other specific non-program information described herein.

Such information and program instructions may be employed to implement the systems/methods described herein and thus, at least a portion of network device example embodiments may include non-transitory computer-readable record media that may be configured or designed to store program instructions and status information, etc., in order to perform various operations described herein. Examples of the non-transitory computer-readable media may include magnetic media such as hard disks, floppy disks, and magnetic tapes; optical media such as CD-ROM discs; magneto-optical media such as floptical disks; and hardware devices that are specially configured to store and perform program instructions, such as ROM, flash memory, memristor memory, RAM, and the like. However, they are provided as an example only. Examples of program instructions include both machine code, such as produced by a compiler, and files containing higher level code that may be executed by the computer using an interpreter.

Figure 2:
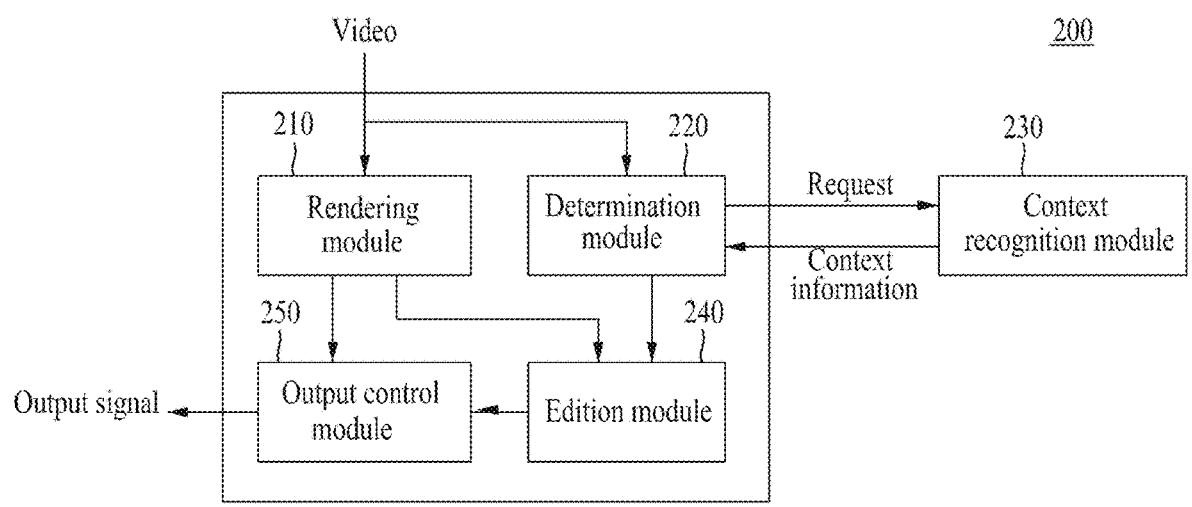
FIG. 2 is a diagram illustrating a structure of an augmented reality (AR) application that recognizes a context using a neural network according to at least one example embodiment.

FIG. 2 is a block diagram illustrating a structure of an AR application 200 that recognizes a context using a neural network according to at least one example embodiment. The AR application 200 is installed and executed on the AR providing apparatus implemented by the computing device 100. The AR application 200 may be included in a memory of the AR providing apparatus, for example, the memory 130 of the computing device 100, and may be executed under control of a processor, for example, the processor 110 of FIG. 1. The AR application 200 may provide AR that overlappingly displays an object in a video captured from a camera in real time. In detail, in the AR that is provided according to an example embodiment, a virtual object may be displayed with a video captured from the camera in real time by recognizing a plane actually present around the computing device, and by determining an attribute of the recognized plane. The AR application 200 may be implemented in a hardware or software manner. A portion of components included in the AR application 200 may be implemented in a hardware or software manner. For example, the AR application 200 may be implemented by processing circuitry which includes hardware (e.g., an application-specific integrated circuit (ASIC) or field programmable gate array (FPGA)) physically structured to carry out any or all operations described in the present specification as being performed by the AR application 200 (or a module or element thereof) or a combination of hardware and software (e.g., memory storing computer-executable instructions corresponding to any or all operations described in the present specification as being performed by the AR application 200 (or a module or element thereof) and one or more processors configured to execute the computer-executable instructions). The CPU 110, which will is discussed above with reference to FIG. 1, is an example of the above-referenced processing circuitry.

Referring to FIG. 2, the AR application 200 may include a rendering module 210, a determination module 220, a context recognition module 230, an edition module 240, and an output control module 250. The AR application 200 may receive a video captured through the camera, speech input through a microphone, a sensing value acquired through a sensor, and the like. Here, the AR application 200 may convert the speech input through the microphone to a text using a speech recognition technique. The AR application 200 may analyze a video captured using a vision recognition technique. A type of a space, a three-dimensional (3D) model, a type and a location of an object, a location and a feature point of a face, a feature vector, etc., may be derived from the video using the vision recognition technique. The AR application 200 may derive current location information based on location information acquired through a global positioning system (GPS) module. The AR application 200 may acquire context information about an environment of a user by collectively considering the speech, the video, and the sensing value.

The rendering module 210 functions to apply AR to the input video, image(s). The rendering module 210 may render a virtual object in the video. The rendering module 210 may acquire distances from a sensor, for example, a sensor 120 of FIG. 1, (e.g., a distance sensor, a direction sensor, etc.) to a plurality of points ahead. If a plane is present in front, the rendering module 210 may acquire a distance and a direction from each of a plurality of points present on the plane and may acquire a plane equation, a plane vector, etc., as plane information including the plurality of points, for example, information defining the plane. Here, the sensor, for example, the sensor 120 of FIG. 1, may be an infrared (IR) sensor and may measure a distance from a point by emitting IR light and receiving reflected IR light. Also, the sensor may be an ultrasound sensor and may measure a distance from a point at which an ultrasound wave is reflected by emitting the ultrasound wave and receiving the reflected ultrasound wave. The sensor may be an acceleration sensor, an angular velocity sensor, a geomagnetic sensor, or a combination of at least two thereof. The sensor may recognize the direction of gravity and may measure a direction faced by a terminal based on the recognized direction of gravity.

The rendering module 210 may render a virtual object in the video based on the video captured through the camera and plane information acquired through the sensor. The virtual object may refer to an object configured to be recognized visually or aurally, and a type of the virtual object may include an image, a text, sound, and the like, without being limited to a specific form. The virtual object may be represented on the acquired plane. The virtual object may be called in response to a speech input or a touch input from the user. The rendering module 210 may generate and render an additional virtual object determined in response to the speech input and the touch input from the user. The rendering module 210 may generate and render at least one virtual object every frame based on a frame rate of the video. The rendering module 210 may be operated by one of at least one processor of the computing device. Therefore, a processing rate of the rendering module 210, that is, a speed of rendering and displaying through an I/O device may depend on the processing capability of the processor. For example, if the processing capability of the processor increases, the rendering module 210 may increase by a specific rate of the increased processing capability of the processor. In contrast, if the processing capability of the processor decreases, the processing rate of the rendering module 210 may decrease by a specific rate of the decreased processing rate of the processor. In another example embodiment, the processing rate of the rendering module 210 may increase or decrease depending on a thread that the computing device is currently operating. For example, the rendering module 210 may operate with the remaining processing capability excluding the processing capability of the processor allocated to at least one thread being currently operated.

The determination module 220 may function to determine whether to execute, that is, an execution point in time of the context recognition module 230 in the video to which the AR is applied. To prevent the video output latency caused by a lack of the processing capability of the processor according to the simultaneous execution with the rendering module 210, the determination module 220 may determine whether to execute the context recognition module 230. Through this, the execution frequency of the context recognition module 230 may decrease. The determination module 220 may determine whether to execute the context recognition module 230 based on input data, that is, the video, the input speech, location information, and the like. The determination module 220 may infer the processing capability of the processor to be used for processing the input data based on the input data and may determine whether a current situation is free from the processing latency by execution of the context recognition module 230 within the processing capability of the processor. The determination module 220 may determine whether to execute the context recognition module 230 based on the processing capability of the processor to be used for processing the input data.

The determination module 220 may determine whether to execute the context recognition module 230 based on a determination criterion that includes determination regarding whether a scene change is present in the acquired video based on the input data. The determination criterion may compare a current frame and a frame (hereinafter, a previous frame) previously acquired in time compared to the current frame and may determine whether to apply the context recognition module 230 to the current frame. The determination module 220 may use a comparison process between the current frame and the previous frame to determine whether the scene change is present.

Further describing the comparison process, the determination module 220 may calculate a first histogram of the current frame and a second histogram of the previous frame, may compare the calculated first and second histograms, and may determine whether the scene change is present. Here, a histogram may refer to a distribution diagram in which pixels of the current frame of the video are distributed based on color values. In detail, if a number of pixels having a first color value in the current frame is significantly less by a specific rate (e.g., 50%) or significantly greater by a specific rate (e.g., 150%) than a number of pixels having the first color value in the previous frame, the determination module 220 may determine that the scene change is present in the current frame. The determination module 220 may compare a number of pixels within a first range through the first histogram of the current frame and a number of pixels within a second range through the second histogram and may determine that the current frame includes a scene different from that of the previous frame.

The determination module 220 may determine whether the scene change is present based on a color and a shape of an object detected from the current frame of the video. In detail, the determination module 220 may acquire edge information in the current frame and may extract color information and shape information of an object by synthesizing the edge information. If object information in the current frame does not match object information in the previous frame, the determination module 220 may determine that the scene change is present. Whether objects present in frames correspond to each other may be determined using a scale-invariant feature transform (SIFT) algorithm. Using the SIFT algorithm, the determination module 220 may calculate invariant information, irrespective of a change in a size, a location, and a direction of each object. The determination criterion that includes a scene change status may be determined using a video analysis result and direction information and motion information acquired through the sensor of the computing device. By using the direction information and the motion information of the computing device, a direction of the computing device may be three-dimensionally estimated, which may be used to determine whether the scene change is present. For example, if direction information or motion information of the computing device differs from previously acquired direction information or motion information by a predetermined threshold value or more, the determination module 220 may determine that the direction or the location of the computing device is physically changed and may determine whether the scene change is present based on the determination result.

If it is determined that the scene change is present, the determination module 220 may determine that a context recognition processing status is true and may request the context recognition module 230 to calculate context information of the video.

In another example embodiment, the determination module 220 may determine the context recognition processing status based on the processing capability of the processor. The determination module 220 may monitor the processing capability of the processor and the remaining capability excluding the processing capability from a total capability value of the processor and, if the processing capability of the processor used for an executing thread, program, etc., exceeds a preset threshold value, that is, if it is determined that the remaining capability of the processor is sufficient to execute the context recognition module 230, may determine that the context recognition processing status is false. The determination module 220 may determine the context recognition processing status again based on a video output rate, that is, a frame rate of a video output. If the video output rate is normally processed without being delayed, it may represent that the processor or the memory is not overloaded. For example, if the frame rate of the video output is detected to be less than an average frame rate, it may represent that the computing device is overloaded. In this case, the determination module 220 may determine that the context recognition processing status is false.

As described above, the determination module 220 may function to determine whether to execute the context recognition module 230, that is, a context recognition processing status by synthesizing input data, whether the scene change is present in the video, the performance of the processor, processing capability, output data, that is, a video output rate, and the like, and may execute the context recognition module 230 only at a selected point in time. In detail, if it is determined that the context recognition processing status is true, the determination module 220 may forward a signal for requesting context information and the current frame to the context recognition module 230, and may receive a response thereto. If it is determined that the context recognition processing status is false, the determination module 220 may not perform a process of acquiring the context information. If it is determined that the context recognition processing status is false, the determination module 220 may not call the context recognition module 230. In response to the request from the determination module 220, the context recognition module 230 may be executed with the rendering module 210 by at least one processor. Here, an OS of the computing device may perform appropriate scheduling for executing the context recognition module 230 and the rendering module 210. Here, the remaining capability may refer to the processing capability not used or allocated, aside from the processing capability allocated to programs being executed in the computing device.

The context recognition module 230 may be executed by the determination module 220, and may analyze a frame and/or a sensing value using the neural network, may calculate context information based on the analysis result, and may forward the context information to the determination module 220. The context recognition module 230 may calculate output data, that is, context information through a process of classifying at least one factor included in the input data, that is, the frame and/or the sensing value. Here, the at least one factor included in the input data, that is, the frame and/or the sensing value and the output data, that is, the context information may be learned as a set. Classifying the at least one factor included in the input data, that is, the frame and/or the sensing value may use a connection between the at least one factor included in the input data and the output data during the learning process. Here, the input data may be connected to hidden data for inferring the output data. Here, the hidden data refers to a factor or data that is not included in input or output, but used for a classification process. Output data corresponding to input data may be calculated using a connection between at least two of the learned input data, hidden data, and output data. The input data according to the example embodiment may include various types of data, for example, a frame, a sensing value, and sound data. The output data according to the example embodiment may include context information that includes at least one attribute information and may vary depending on the input data and/or data requested by the user.

The neural network used by the context recognition module 230 may be generated through pre-training by an external server, and may be continuously trained and updated based on input data that requests context recognition and output data. According to an increase in an amount of input data, the accuracy of context information acquired through the neural network may be improved. Also, a connection between at least two of input data, hidden data, and output data included in the neural network may have a non-linear relationship. For example, a first connection between first data and second data may be set to 0.3, not 0 or 1. A second connection between the first data and third data may be set to 0.7. The first data may be classified as the second data or the third data at a ratio of 3:7.

The context recognition module 230 may be executed in response to a call by the determination module 220 and may perform processing for each attribute information based on the neural network, and may calculate and provide at least one piece of context information corresponding to a frame included in the video and sound data input through a microphone. The context recognition module 230 may be included in the AR application 200 or may be included in another application or an OS, and may also be included in an external apparatus. The determination module 220 may transmit and receive data to and from the context recognition module 230 over a network.

Here, the context information may include information about various attributes around the computing device. For example, the context information may include information (e.g., a name, a location, a path, etc.) about a nearby place, information (e.g., a name, a product name, details, etc.) about an object recognized through the computing device, and information (e.g., an age, emotion, resemblance, etc.) about a person recognized through the computing device. According to example embodiments, the context information may be acquired from at least one of a captured video, a sensing value, and sound data using the neural network.

The edition module 240 may generate additional content to which context information of the current frame is applied using the neural network. The additional content may be graphic data, for example, a character, a place, a construction, an effect, etc., set by the user. Examples of the additional content are further described with reference to FIGS. 10A, 10B, 10C, and 10D.

The output control module 250 controls the picture data received through the rendering module 210 and the edition module 240 to be output.

According to example embodiments, an AR application may generate context information corresponding to an input video, a sensing value, and sound data while providing AR that adds graphic data to a video with a limited computing performance. The AR application may prevent overload caused by the limited computing performance by adjusting the generation frequency of the context information. Although a communication network is disconnected, the AR application may calculate context information corresponding to input data without using an external resource.

Figure 3:
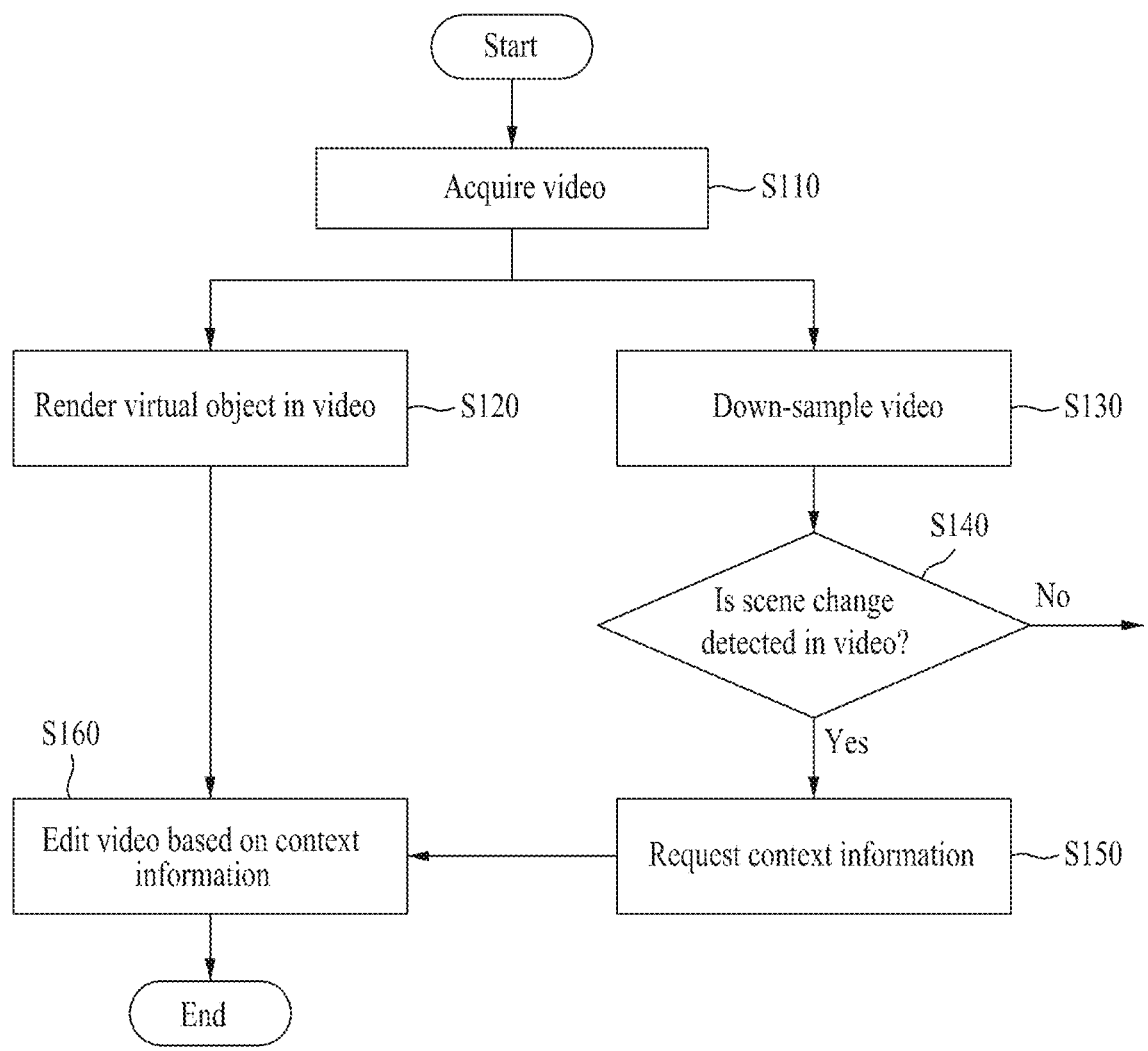
FIG. 3 is a flowchart illustrating an AR providing method for recognizing a context using a neural network according to at least one example embodiment.

FIG. 3 is a flowchart illustrating an AR providing method for recognizing a context using a neural network according to at least one example embodiment.

Referring to FIG. 3, in operation S110, the AR application 200 may acquire a video (or image). Here, the video may be captured through a camera in real time. Also, the video may include a set of various frames generated by another application.

In operation S120, the AR application 200 may render a virtual object in the video. Operation S120 is further described with reference to FIG. 4. In operation S130, the AR application 200 may down-sample the video. The AR application 200 may convert the video using a plurality of scales. The video converted using the plurality of scales may be referred to as a scale space. In operation S140, the AR application 200 may determine whether a scene change is present in the down-sampled video. Operation S140 is identical to the aforementioned operation of the determination module 220 and thus, further description is omitted. If the scene change is detected in the video in operation S140, the AR application 200 may request the context recognition module 230 for context information of input data in operation S150. In operation S160, the AR application 200 may edit the video based on the received context information. The AR application 200 may additionally provide visual data based on the context information. The AR application 200 may use a different video edition method based on a type of the received context information. The video edition method is further described with reference to FIGS. 10A to 10D.

Figure 4:
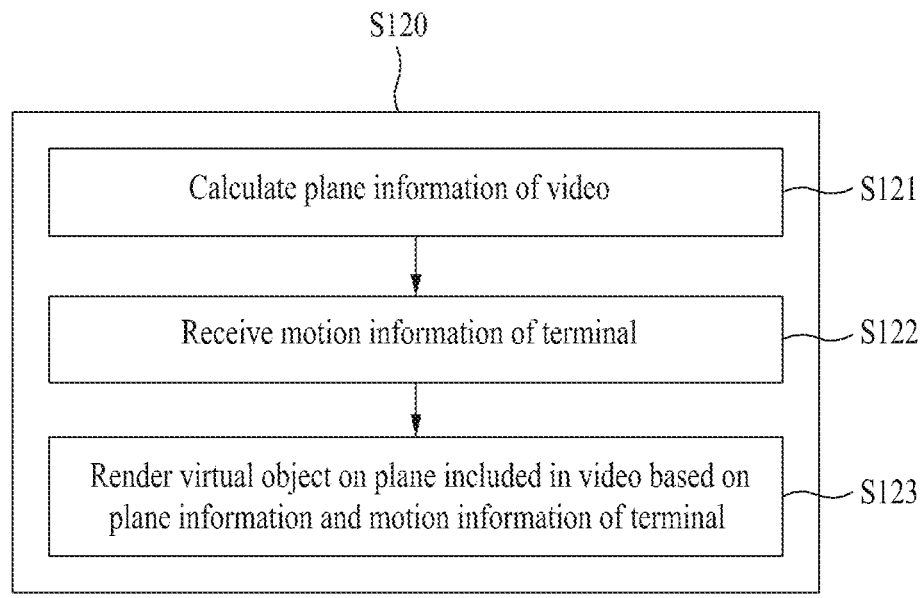
FIG. 4 is a flowchart describing an operation of a rendering module.

FIG. 4 is a flowchart describing an operation of a rendering module.

Referring to FIG. 4, in operation S121, the rendering module 210 may calculate plane information about a plane that includes a plurality of points based on distances from the plurality of points. The rendering module 210 may calculate plane information about the plane that includes the plurality of points based on distances from and directions of the plurality of points.

In operation S122, the rendering module 210 may acquire a normal vector of the plane based on direction information of a terminal measured by a sensor and the plane information acquired in operation S121. The rendering module 210 may acquire direction information of the terminal measured by a direction sensor and may acquire the normal vector of the plane based on the acquired plane information and direction information of the terminal. In detail, the rendering module 210 may convert a reference direction of plane information from a direction of the terminal (or a direction that a distance sensor installed in the terminal faces) to a reference direction of the direction sensor. In detail, the rendering module 210 may acquire final direction information of the plane based on the direction of gravity by moving direction information of the plane acquired based on the direction of the terminal by direction information of the terminal measured by the direction sensor (based on the direction of gravity recognized by an acceleration sensor). The direction information of the reference plane acquired based on the direction of gravity may be the normal vector of the plane.

In operation S123, the rendering module 210 may determine a parameter of a virtual object based on the normal vector of the plane. The rendering module 210 may determine the parameter of the virtual object to be displayed on the plane based on the normal vector of the plane. An object may include a plurality of parameters. Examples of the parameter may include a color, a gradient, a category, a type, and a direction of the virtual object, and an animation to apply to the object. For example, the rendering module 210 may set a gradient of the virtual object to correspond to a direction of the normal vector of the plane.

The rendering module 210 may classify an attribute of the plane based on the normal vector of the plane. Also, the rendering module 210 may determine a parameter of the virtual object based on the attribute of the plane. The attribute of the plane may be classified into, for example, a floor, a wall, or a ceiling, as a type of the plane. The rendering module 210 may differently determine the parameter of the object depending on whether the plane is classified as the floor, the wall, or the ceiling. For example, if the plane is classified as the wall, the rendering module 210 may set an animation parameter such that the object may move in a path through the plane. If the plane is classified as the floor, the rendering module 210 may set an animation parameter such that the object may move in parallel with the floor on the floor.

The rendering module 210 may determine a parameter of the virtual object based on each of direction information of the plane (based on a direction of the terminal) and an attribute of the plane determined based on the normal vector of the plane. For example, the rendering module 210 may determine a first parameter of the object based on the attribute of the plane and may determine a second parameter of the virtual object based on the normal vector of the plane. For example, the rendering module 210 may determine a color of the object based on the attribute of the plane and may determine a gradient of the virtual object based on the direction of the plane. If the object is an icon, the rendering module 210 may differently determine a color of the icon based on a type of the plane and may determine a gradient of the icon based on a direction of the plane. The gradient may refer to a gradient for rendering and displaying 3D icon display information in a two-dimensional manner or may be a horizontal/vertical display ratio of the icon.

In operation S123, the rendering module 210 may display the virtual object through a connected I/O device. The rendering module 210 may extract the plane from the video captured through the camera and may arrange the virtual object on the plane. A display direction of the virtual object may be used to two-dimensionally render and display 3D display information (e.g, 3D furniture display information), and, without being limited thereto, may be used to rotate and/or scale and display 2D display information (e.g., 2D furniture display information). If a parameter of the virtual object includes animation, the rendering module 210 may display the virtual object by applying the animation. For example, in the case of displaying the virtual object set with the animation of coming through the wall on the plane with the attribute "wall," the rendering module 210 may represent the animation that the virtual object comes through the plane by overlappingly (i.e., in an overlapping manner) displaying an opaque virtual layer for the virtual object on the plane and by displaying the virtual object to move front from behind the virtual layer. The virtual layer may be set to be transparent for other displays other than the virtual object.

According to an example embodiment, the rendering module 210 may set a virtual object that represents sun, moon, or star on the plane with the attribute "ceiling." According to an example embodiment, the rendering module 210 may set the virtual object that moves between a plurality of planes. For example, the rendering module 210 may set a droplet object that moves from the plane with the attribute "ceiling" toward the plane with the attribute "floor." The droplet object may include animation of being scattered in the same direction as that of the corresponding plane when the droplet object reaches the plane with the attribute "floor."

Figure 5:
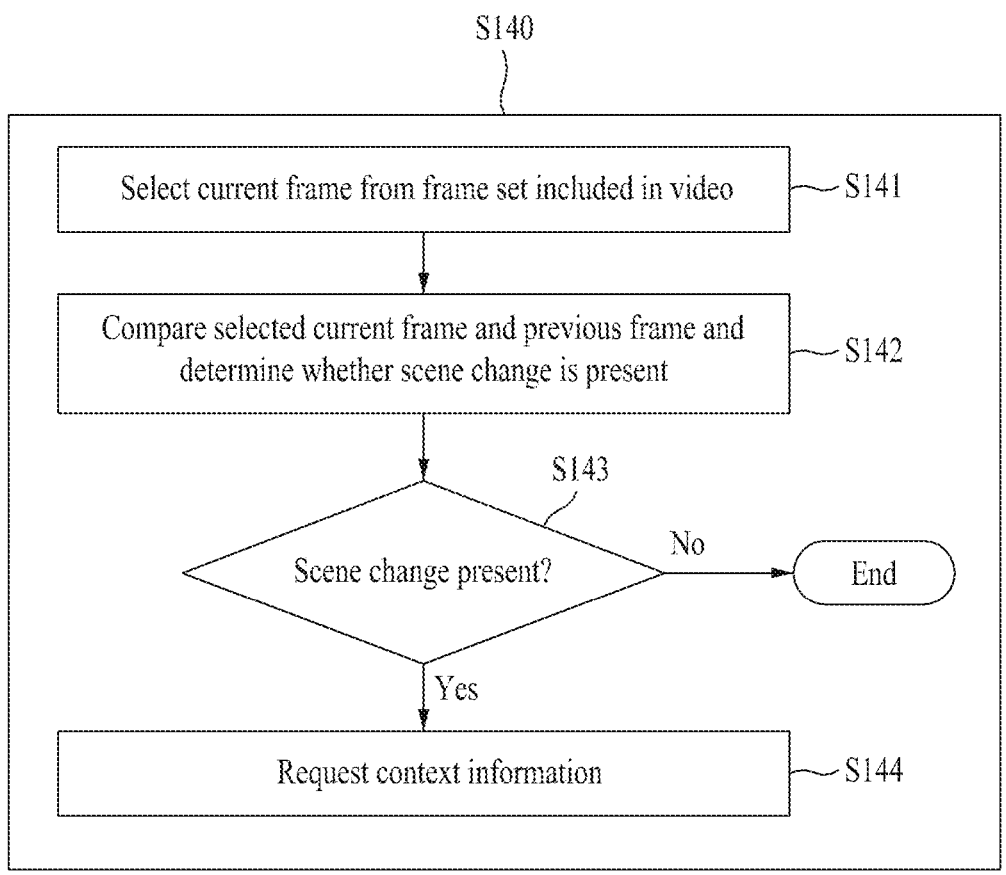
FIG. 5 is a flowchart describing an operation of a determination module.

FIG. 5 is a flowchart describing an operation of a determination module.

The determination module 220 functions to determine a point time for acquiring context information using the context recognition module 230. Through the determination module 220, a video processing method according to an example embodiment may effectively manage the processing capability of a processor in terms of adding a virtual object to a captured video and, at the same time, providing additional content according to context information of the captured video.

Referring to FIG. 5, in operation S141, the determination module 220 may select a current frame from a frame set included in the video. In operation S142, the determination module 220 may compare the current frame and a previous frame and may determine whether a scene change is present in the current frame. If a number of pixels according to a color value using a histogram that is a color value distribution of the current frame differs from a number of pixels according to a corresponding color value of the previous frame by a preset reference rate or more, the determination module 220 may determine that a scene change is present in the current frame (i.e., true/yes in operation S143). In operation S144, the determination module 220 requests or acquires the context information. The determination module 220 may determine a shape and a color of an object present in the current frame, may determine whether the object present in the current frame is identical to an object present in the previous frame, and, if the objects are identical, may determine that the scene change is absent (i.e., false/no in operation S143).

As described above, the determination module 220 may readily implement and output AR content according to the example embodiment by using the limited processing capability of the processor through reduction in the execution frequency of the context recognition module 230.

Figure 6A:
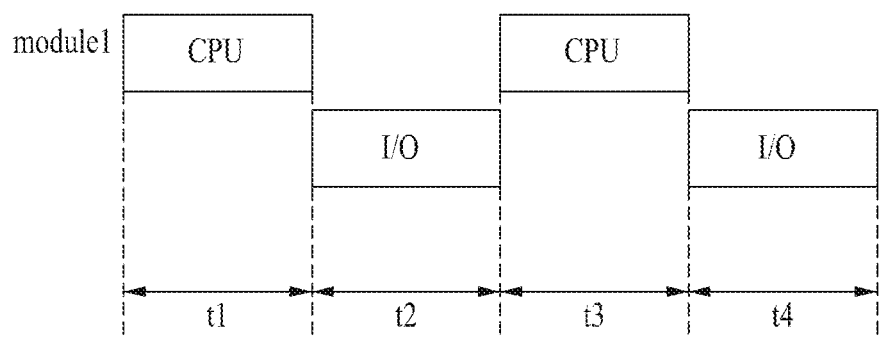
FIGS. 6A and 6B illustrate a process of processing a plurality of modules using a processor with limited capability according to at least one example embodiment.
Figure 6B:
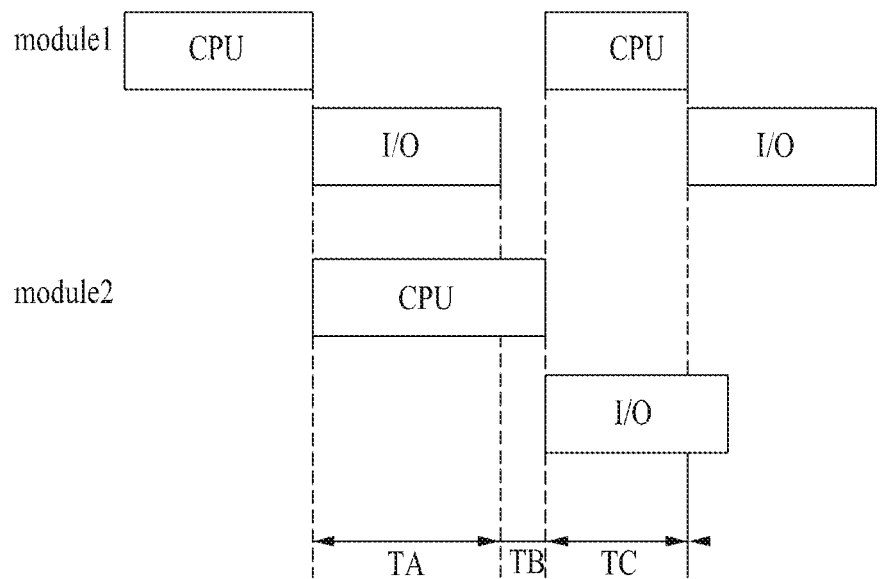

FIGS. 6A and 6B illustrate a process of processing a plurality of modules using a processor with limited capability according to at least one example embodiment.

Hereinafter, a process of processing and inputting/outputting a module using a processor is described with reference to FIG. 6A. Referring to FIG. 6A, a first module (module 1) is executed in a first time (t1) by the processor, an execution result is input/output in a second time (t2), the first module is executed again by the processor in a third time (t3), and an execution result is input/output in a fourth time (t4).

Hereinafter, a process of simultaneously executing a rendering module (module 1) and a context recognition module (module 2) is described with reference to FIG. 6B. A process of processing each module using the processor and outputting the same using the I/O device may be alternately performed. Referring to FIG. 6B, input/output of each module may not use the processing capability of the processor. After a time in which the rendering module (module 1) is processed by the processor, the context recognition module (module 2) may be processed by the processor. After an input/output time of the rendering module, the processor processes the rendering module (module 1). Here, processing of the rendering module (module 1) may be delayed by a time TB for execution of the context recognition module (module 2). In this case, a determination module, for example, the determination module 220 of FIG. 2 may determine whether to execute the context recognition module (module 2) at a point in time at which the rendering module (module 1) is input/output, and may execute the context recognition module (module 2) only when the execution is required as a determination result. If the context recognition module (module 2) is not executed based on the determination of the determination module, execution of the rendering module (module 1) may not be delayed.

The determination module may prevent execution of the context recognition module from being delayed or may prevent execution of the rendering module from being delayed due to processing of the context recognition module. The determination module may prevent processing of modules to be executed from being delayed due to the limited performance of the computing device by determining an appropriate point in time for execution of the context recognition module.

Figure 7:
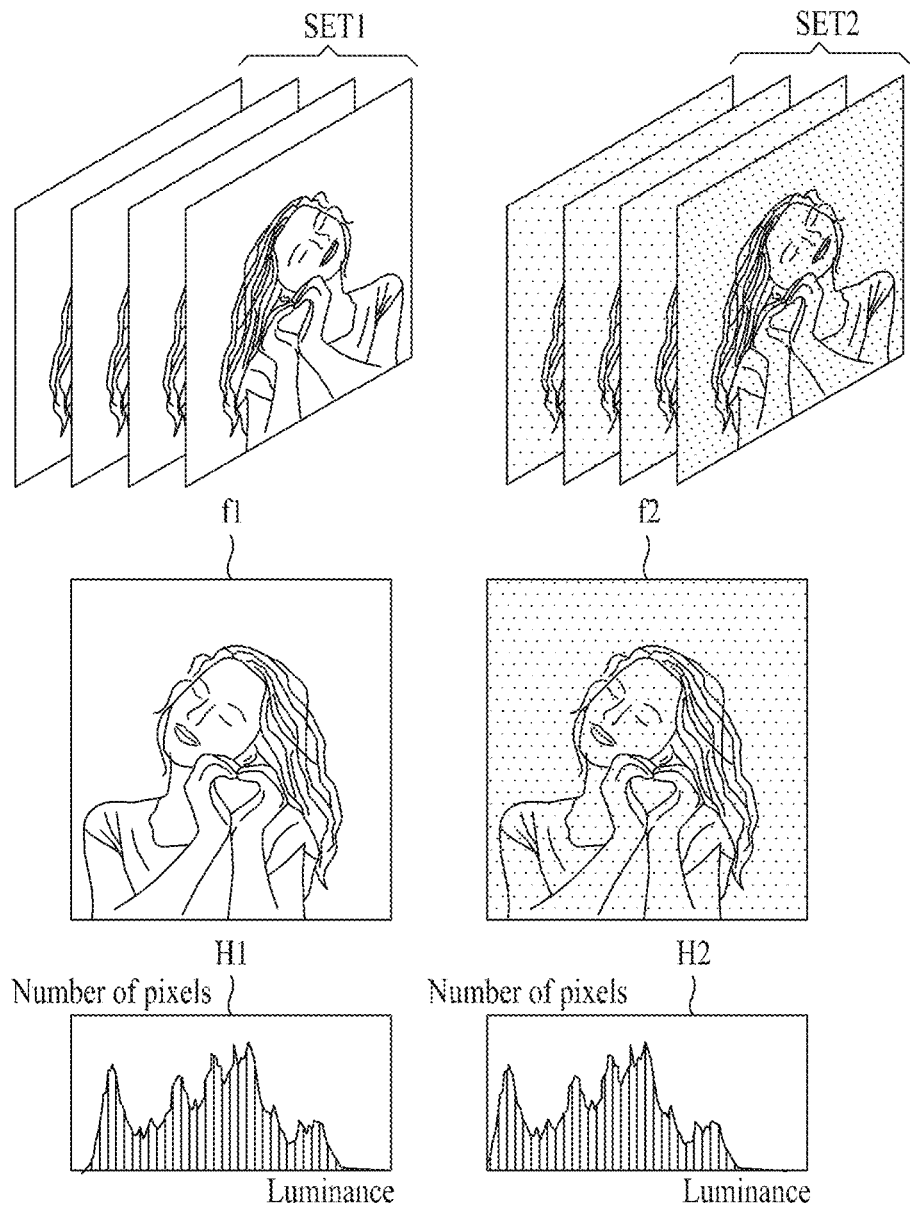
FIGS. 7 to 9 illustrate examples of describing an operation of comparing a current frame and a previous frame through a determination module according to at least one example embodiment.
Figure 8:
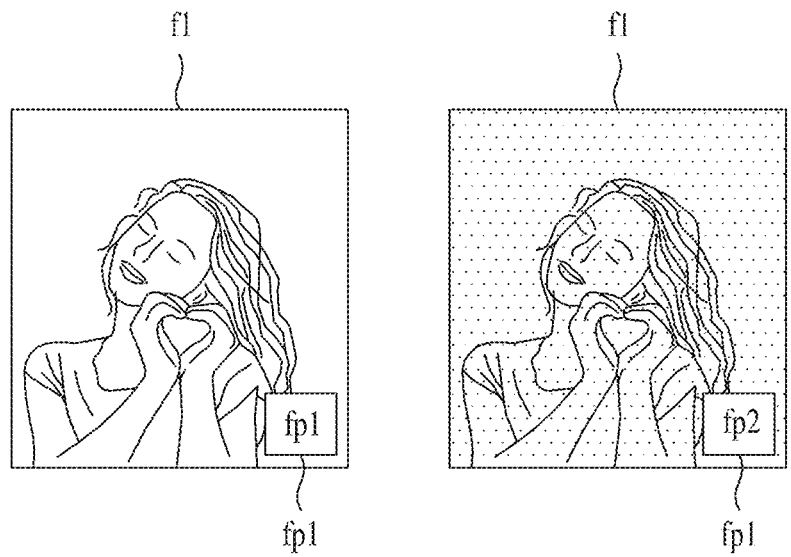
Figure 9:
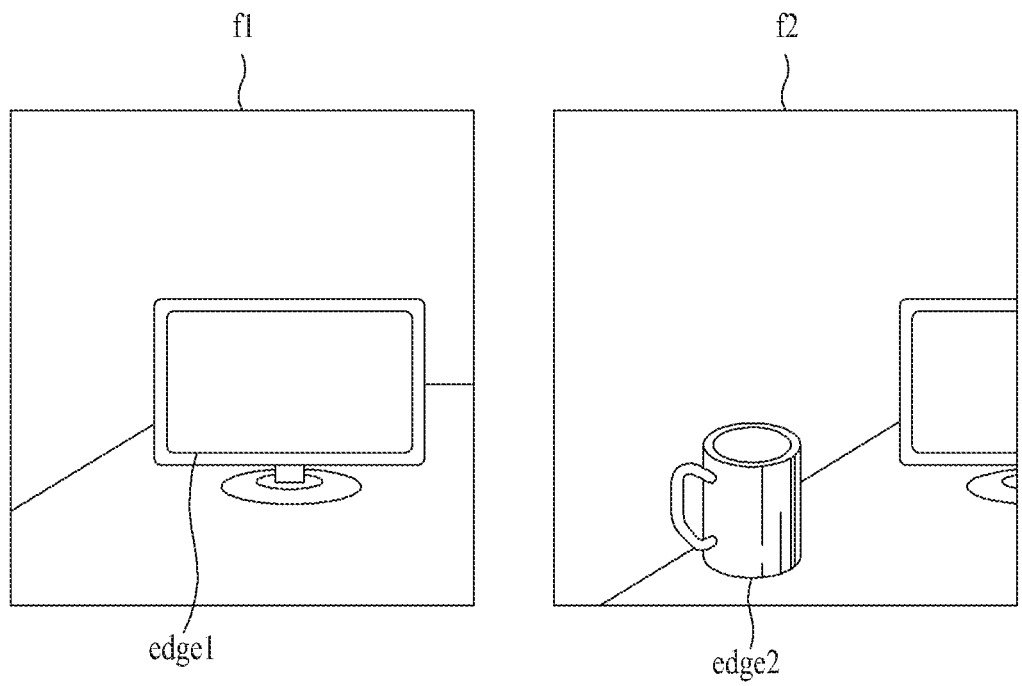

FIGS. 7 to 9 illustrate examples of describing an operation of comparing a current frame and a previous frame through a determination module according to at least one example embodiment.

A captured video may include a first frame set (SET1) and a second frame set (SET2) based on a predetermined time section. The determination module 220 may arbitrarily select a first frame (f1) of the first frame set (SET1) and also arbitrarily select a second frame (f2) of the second frame set (SET2). The determination module 220 may generate pixels of the first frame (f1) into a distribution diagram (H1) based on color values. The first distribution diagram (H1) refers to a graph in which a number of pixels is represented for each color value by counting a number of pixels of the first frame (f1). A second distribution diagram (H2) may also be generated in the same manner. Referring to FIG. 7, although a color value varies, a distribution form between the first distribution diagram (H1) and the second distribution diagram (H2) may be identical or similar within 10% as a result of comparison therebetween. In this case, the determination module 220 may determine that there is no scene change.

Referring to FIG. 8, the determination module 220 may extract and compare an area of a frame to reduce an amount of data to be processed. The determination module 220 may compare an area of the first frame (f1) and an area of the second frame (f2) and may determine whether a scene change between the first frame (f1) and the second frame (f2) is present.

Referring to FIG. 9, the determination module 220 may determine whether a scene change between the first frame (f1) and the second frame (f2) is present by extracting an edge of the first frame (f1) and an edge of the second frame (f2) and by comparing the extracted edges. The determination module 220 may determine whether the scene change between the first frame (f1) and the second frame (f2) is present by acquiring a rectangle (edge 1) that is a shape of an appearance object from the edge of the first frame (f1) and a cylinder (edge2) that is a shape of an appearance object from the edge of the second frame (f2) and by comparing the acquired shapes. That is, the determination module 220 may determine that the scene change is present between the first frame (f1) and the second frame (f2).

FIGS. 10A to 10D illustrate examples of using context information acquired through a context recognition module according to at least one example embodiment.

Figure 10A:
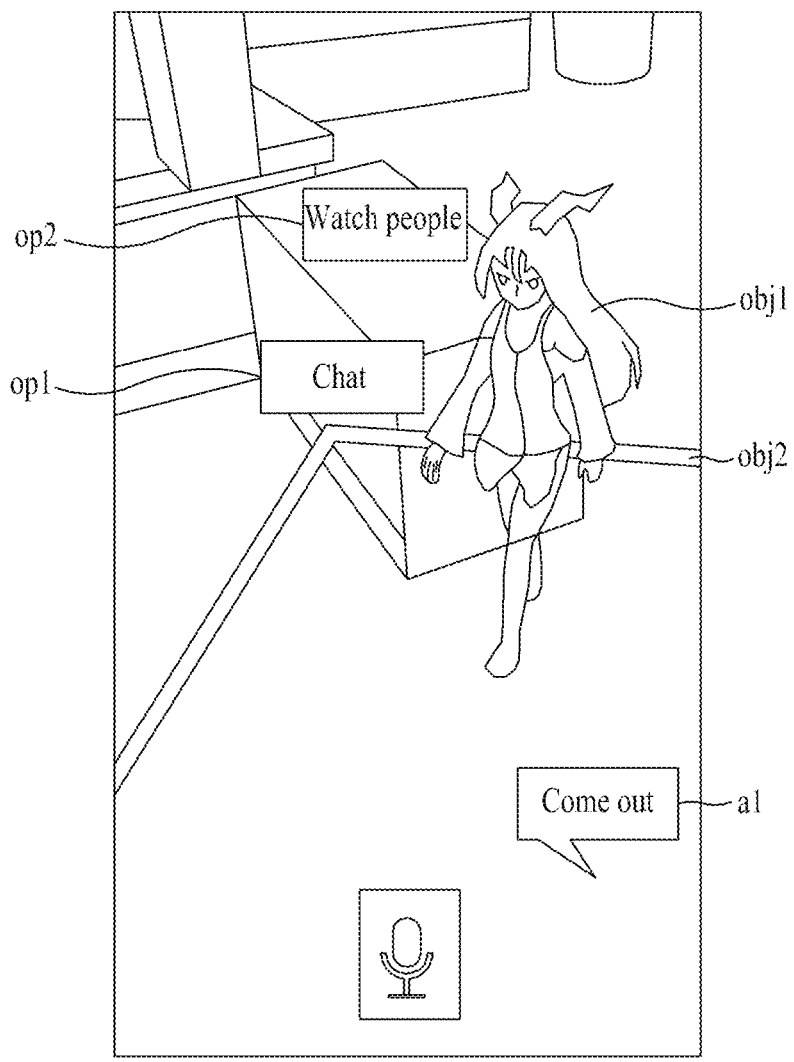
FIGS. 10A to 10D illustrate examples of using context information acquired through a context recognition module according to at least one example embodiment.

Referring to FIG. 10A, an AR application, for example, the AR application 200 of FIG. 2, may render AR in a video provided through an I/O device. In particular, the AR application may recognize a plane present in the captured video and may arrange a virtual object on the plane. The AR application may perform rendering by generating the acquired plane into a virtual object (obj 2) and may arrange a virtual object (obj 1) that is a character on the plane. Here, the virtual object (obj 1) may be generated in response to a preset instruction signal. For example, in response to receiving the preset instruction "come out" in a form of speech or text, the virtual object (obj 1) may be rendered.

Figure 10B:
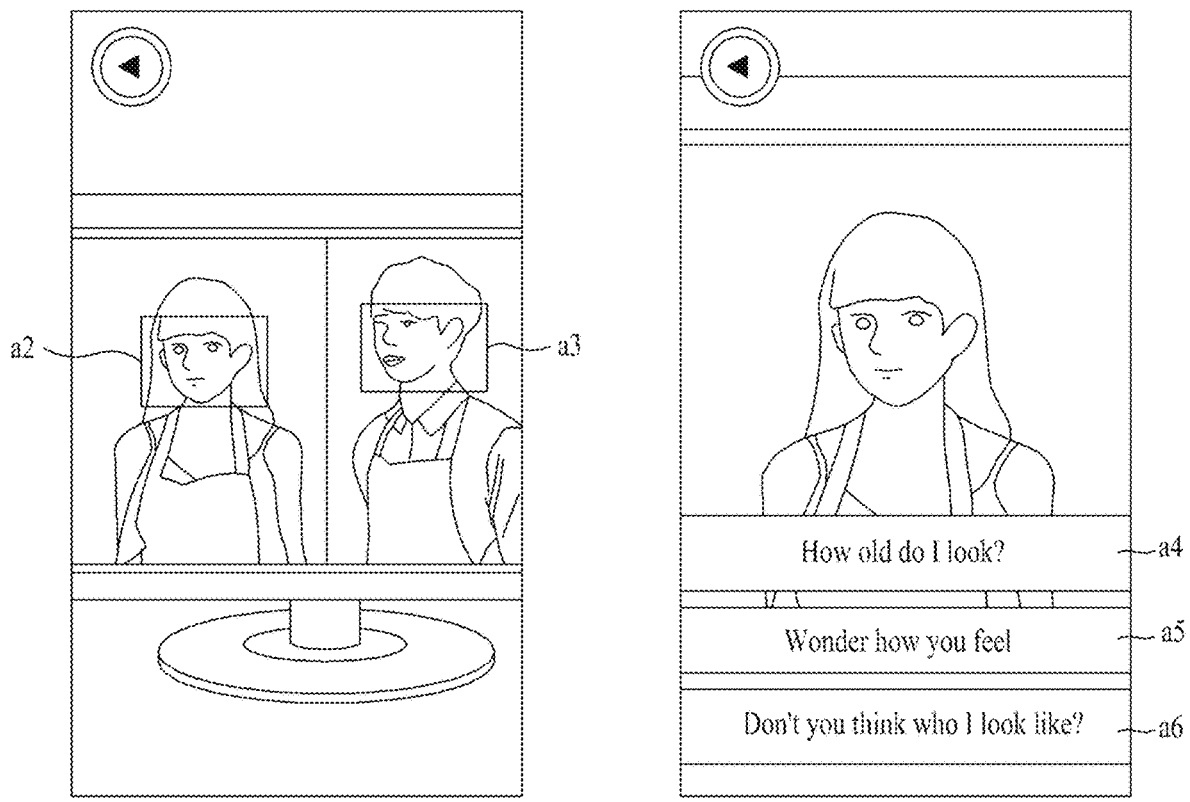

Referring to FIG. 10B, the AR application may acquire, as context information, information about an age, emotion, and resemblance with respect to a human face present in a video and may provide the acquired information. The AR application may determine whether a human face is present in a captured video using a vision recognition technique. If the human face is detected in the captured video, human face areas (a2, a3) may be overlapped in a rectangular shape. The AR application may interact with a virtual object in response to detecting the human face. For example, in response to detecting the human face, the virtual object may provide, as audio, additional content, such as "How old do I look? (a4)," "Wonder how you feel (a5)," "Don't you think who I look like? (a6)," and the like. In response to a selection and an input on additional contents, the AR application may call a context recognition module and may receive context information. In response to a selection and an input on a4, the AR application may acquire an age of a person calculated through the context recognition module as a probability map. The AR application may output the age included in the probability map and a probability value for the age as a text or speech of the virtual object. Emotion information or resemblance information may also be acquired through the context recognition module.

Figure 10C:
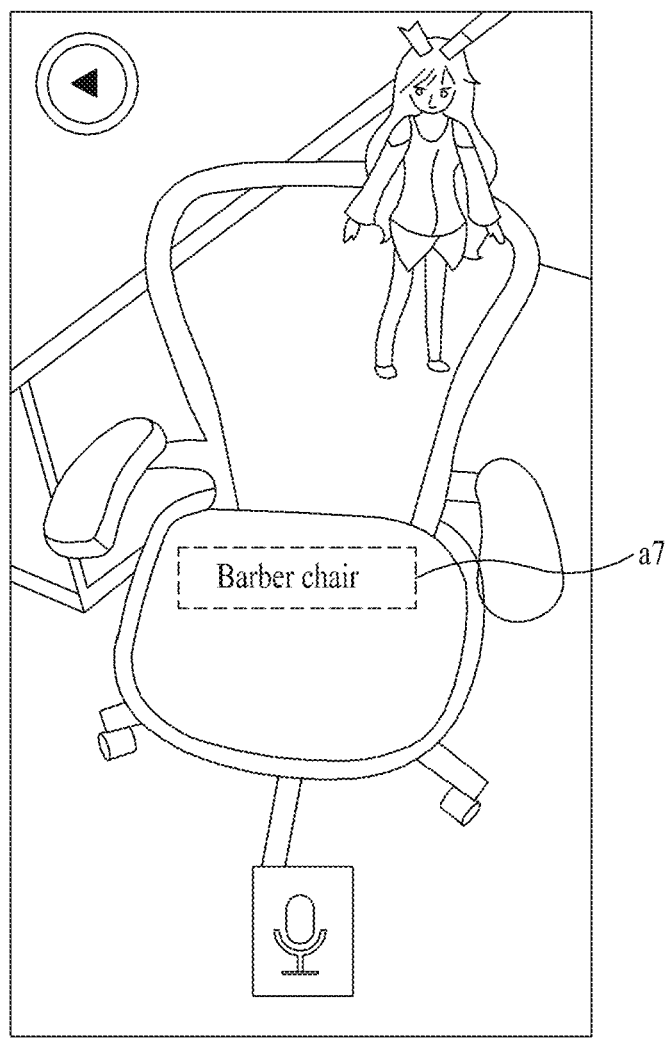

Referring to FIG. 10C, the AR application may provide a name (a7) of an object included in a video in a form of a text, a video, speech, etc., based on context information acquired through the context recognition module.

Figure 10D:
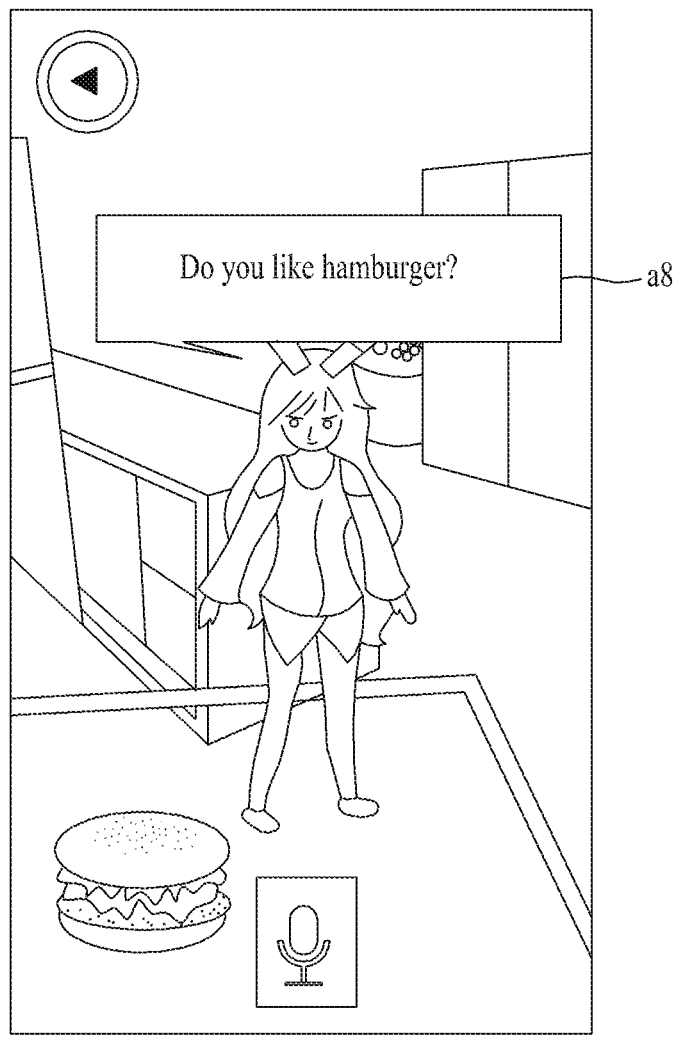

Referring to FIG. 10D, the AR application may make a conversation with a user based on context information acquired through the context recognition module. The AR application may generate a conversation (a8) "Do you like hamburger?" for a virtual object using context information such as "hamburger." The conversation may be made using a place, a thing, and the like, included in the context information.

In addition, if context information, such as a region and a location, is recognized, the virtual object may initiate a conversation about the region and the location.

If a human face is detected at least once by learning the human face from the video, the AR application may apply such context information and may provide a conversation "Nice to meet you. We see often."

If context information, such as an obstacle being present in a captured video, is calculated, a virtual object may be generated to make a surprised facial expression.

The virtual object provided by the AR application may be set to have a specific function.

For example, the virtual object may be set as a secretary configured to provide an output in response to a user instruction by the user. The AR application may generate necessary information based on vision analysis information and location information acquired from the video, and real meta information, such as weather information, and may provide the generated necessary information through the virtual object set as the "secretary."

The AR application may augment a game character set by the user as a virtual object. The virtual object that is the game character may be implemented to behave based on an age, a preset gender, hobby, and propensity of the game character. For example, if "café" is output from the captured video, the virtual object may be implemented to apply the output "café" and to output speech asking order "coffee" that is a favorite beverage based on the propensity in a game.

The AR application may augment a pet set by the user as the virtual object. The virtual object set as the pet, such as a puppy, may be implemented to respond to a "ball," a "snack," and the like, included in the captured video based on characteristics of the pet.

The virtual object may trigger various conversations based on context information acquired through the captured video through interaction with another application. For example, the virtual object may provide a conversation based on context information acquired through a road guide video through interaction with a road guide application. The virtual object may provide information about a building, a road, and the like, present in the road guide video using speech utterance. The virtual object may provide the speech utterance in a conversation form distinguished from speech provided from the road guide application, may play a role of an accompanying friend and family, and may also function to make a friendly conversation with a driver.

The AR application may acquire context information using a video captured in real time, and may recommend an interior based on the context information (a structure of a room, a color and a size of a wallpaper color, an arrangement of existing furniture, etc.). For example, the AR application may recommend suitable furniture, a flowerbed, an accessory, and the like.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An augmented reality (AR) providing method for recognizing a context using a neural network, the method comprising:

acquiring, by processing circuitry, a video;

analyzing, by the processing circuitry, the video and rendering the video to arrange a virtual object on a plane included in the video;

determining whether a scene change is present in a current frame by comparing the current frame included in the video with a previous frame;

determining a context recognition processing status for the video based on the determining of whether the scene change is present in the current frame; and in response to determining that the context recognition processing status is true, analyzing at least one of the video or a sensing value received from a sensor using the neural network and calculating at least one piece of context information, and generating additional content to which the context information is applied and providing the additional content, wherein the providing of the additional content comprises:

providing content including the context information, or generating speech utterance content in a dialog form using the context information and providing the speech utterance content through the virtual object.

2. The method of claim 1, further comprising:

determining whether a processing capability of the processing circuitry exceeds a threshold value, wherein the determining of the context recognition processing status for the video is further based on the determining of whether the processing capability of the processing circuitry exceeds the threshold value.

3. The method of claim 1, further comprising:

determining whether an output frame rate of the video is less than an average frame rate, wherein, the determining of the context recognition processing status for the video is further based on the determining of whether the output frame rate of the video is less than the average frame rate.

4. The method of claim 1, wherein the determining whether the scene change is present comprises:
  determining whether the scene change is present by calculating a distribution diagram in which pixels of the current frame are distributed based on color values, and
  comparing the distribution diagram to a distribution diagram of the previous frame.

5. The method of claim 1, wherein the determining whether the scene change is present comprises:
  extracting a color and a shape of an object by synthesizing edge information using edge information detected from the current frame and determining whether the scene change is present based on the color and the shape of the object.

6. The method of claim 1, wherein the calculating of the context information comprises:
  acquiring the context information by limiting, according to a user input, a type of context information calculated in response to the user input.

7. The method of claim 1, wherein the video is picture data captured using a camera or generated using another application and then output.

8. The method of claim 1, wherein the calculating of the at least one piece of context information comprises:
  calculating the context information in a form of a probability map that further includes a matching probability about each piece of context information, and
  ranking and forwarding the at least one piece of context information based on the matching probability about each piece of context information.

9. An augmented reality (AR) providing apparatus comprising:
  processing circuitry configured to,
    acquire a video;
    analyze the video and rendering the video to arrange a virtual object on a plane included in the video;
    determine whether a scene change is present in a current frame by comparing the current frame included in the video with a previous frame;
    determine a context recognition processing status for the video based on the determining of whether the scene change is present in the current frame; and
    in response to determining that the context recognition processing status is true,
      analyze at least one of the video or a sensing value received from a sensor using a neural network and calculating at least one piece of context information, and
      generate additional content to which the context information is applied and providing the additional content,
  wherein the processing circuitry is further configured such that the providing of the additional content comprises:
    providing content including the context information, or
    generating speech utterance content in a dialog form using the context information and providing the speech utterance content through the virtual object.

10. The AR providing apparatus of claim 9,
  wherein the processing circuitry is further configured to determine whether a processing capability of the processing circuitry exceeds a threshold value, and
  wherein the processing circuitry is further configured such that the determining of the context recognition processing status for the video is further based on the determining of whether the processing capability of the processing circuitry exceeds the threshold value.

11. The AR providing apparatus of claim 9,
  wherein the processing circuitry is further configured to determine whether an output frame rate of the video is less than an average frame rate, and
  wherein the processing circuitry is further configured such that the determining of the context recognition processing status for the video is further based on the determining of whether the output frame rate of the video is less than the average frame rate.

12. The AR providing apparatus of claim 9, wherein the processing circuitry is further configured such that the determining of whether the scene change is present includes determining whether the scene change is present by
  calculating a distribution diagram in which pixels of the current frame are distributed based on color values, and
  comparing the distribution diagram to a distribution diagram of the previous frame.

13. The AR providing apparatus of claim 9, wherein the processing circuitry is further configured such that the determining of whether the scene change is present includes extracting a color and a shape of an object by synthesizing edge information using edge information detected from the current frame and determining whether the scene change is present based on the color and the shape of the object.

14. The AR providing apparatus of claim 9, wherein the processing circuitry is further configured to acquire the context information by limiting, according to a user input, a type of context information calculated in response to the user input.

15. The AR providing apparatus of claim 9, wherein the processing circuitry is further configured such that the video is picture data captured using a camera or generated using another application and then output.

16. The AR providing apparatus of claim 9, wherein the processing circuitry is further configured to,
  calculate the context information in a form of a probability map that further includes a matching probability about each piece of context information, and
  rank and forward the at least one piece of context information based on the matching probability about each piece of context information.

17. A non-transitory computer-readable medium storing instructions that, when executed by a processor, cause the processor to perform the AR providing method of claim 1.

18. An augmented reality (AR) providing method for recognizing a context using a neural network, the method comprising:
  acquiring, by processing circuitry, video;
  analyzing, by the processing circuitry, the video and rendering the video to arrange a virtual object on a plane included in the video;
  determining whether a scene change is present in a current frame by comparing the current frame included in the video with a previous frame;
  determining a context recognition processing status for the video based on the determining of whether the scene change is present in the current frame; and
  in response to determining that the context recognition processing status is true,
    analyzing at least one of the video or a sensing value received from a sensor using the neural network and calculating at least one piece of context information, and
    generating additional content to which the context information is applied and providing the additional content, wherein the determining whether the scene change is present comprises:
    determining whether the scene change is present by
        calculating a distribution diagram in which pixels of the current frame are distributed based on color values, and
        comparing the distribution diagram to a distribution diagram of the previous frame.

19. An augmented reality (AR) providing method for recognizing a context using a neural network, the method comprising:
    acquiring, by processing circuitry, a video;
    analyzing, by the processing circuitry, the video and rendering the video to arrange a virtual object on a plane included in the video;
    determining whether a scene change is present in a current frame by comparing the current frame included in the video with a previous frame;
    determining a context recognition processing status for the video based on the determining of whether the scene change is present in the current frame; and
    in response to determining that the context recognition processing status is true,
        analyzing at least one of the video or a sensing value received from a sensor using the neural network and calculating at least one piece of context information, and
        generating additional content to which the context information is applied and providing the additional content,
    wherein the determining whether the scene change is present comprises:
        extracting a color and a shape of an object by synthesizing edge information using edge information detected from the current frame and determining whether the scene change is present based on the color and the shape of the object.

20. An augmented reality (AR) providing method for recognizing a context using a neural network, the method comprising:
    acquiring, by processing circuitry, a video;
    analyzing, by the processing circuitry, the video and rendering the video to arrange a virtual object on a plane included in the video;
    determining whether a scene change is present in a current frame by comparing the current frame included in the video with a previous frame;
    determining a context recognition processing status for the video based on the determining of whether the scene change is present in the current frame; and
    in response to determining that the context recognition processing status is true,
        analyzing at least one of the video or a sensing value received from a sensor using the neural network and calculating at least one piece of context information, and
    generating additional content to which the context information is applied and providing the additional content,
    wherein the calculating of the context information comprises;
        acquiring the context information by limiting, according to a user input, a type of context information calculated in response to the user input.

* * * * *